US009218056B2

United States Patent
Lee et al.

(10) Patent No.: US 9,218,056 B2
(45) Date of Patent: Dec. 22, 2015

(54) EYE TRACKING METHOD AND DISPLAY APPARATUS USING THE SAME

(71) Applicant: SAMSUNG ELECTRONICS CO., LTD., Suwon-si (KR)

(72) Inventors: Dong-jin Lee, Suwon-si (KR); Sung-wook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 13/768,528

(22) Filed: Feb. 15, 2013

(65) Prior Publication Data

US 2013/0207895 A1    Aug. 15, 2013

(30) Foreign Application Priority Data

Feb. 15, 2012    (KR) .................. 10-2012-0015335

(51) Int. Cl.
*G06F 3/033*    (2013.01)
*G06F 3/01*    (2006.01)

(52) U.S. Cl.
CPC ................ *G06F 3/013* (2013.01); *G06F 3/012* (2013.01)

(58) Field of Classification Search
CPC ........... G06F 3/01; G06F 3/012; G06F 3/013; G06F 3/00; G06K 9/00664; H04N 21/44218
See application file for complete search history.

(56) References Cited

U.S. PATENT DOCUMENTS

| 6,774,869 B2 * | 8/2004 | Biocca et al. ..................... 345/8 |
| 7,812,815 B2 * | 10/2010 | Banerjee et al. .............. 345/156 |
| 8,229,089 B2 * | 7/2012 | Song et al. ................. 379/88.16 |
| 8,396,253 B2 * | 3/2013 | Jeong et al. ..................... 382/106 |
| 8,830,164 B2 * | 9/2014 | Sakata et al. .................. 345/156 |
| 2002/0105482 A1 | 8/2002 | Lemelson et al. |
| 2008/0298571 A1 * | 12/2008 | Kurtz et al. .................... 379/156 |
| 2009/0196460 A1 | 8/2009 | Jakobs et al. |
| 2010/0156781 A1 * | 6/2010 | Fahn ............................. 345/156 |
| 2011/0046483 A1 * | 2/2011 | Fuchs et al. ................... 600/439 |
| 2011/0102423 A1 * | 5/2011 | Nam et al. ..................... 345/419 |
| 2011/0182472 A1 | 7/2011 | Hansen |
| 2011/0267374 A1 | 11/2011 | Sakata et al. |
| 2012/0105473 A1 * | 5/2012 | Bar-Zeev et al. ............. 345/633 |
| 2012/0223885 A1 * | 9/2012 | Perez ............................ 345/158 |

(Continued)

FOREIGN PATENT DOCUMENTS

DE    198 19 961 A1    11/1999
WO    99/35633 A2    7/1999

OTHER PUBLICATIONS

Communication dated Jul. 8, 2013 issued by the European Patent Office in counterpart European Patent Application No. 13155395.0.

(Continued)

*Primary Examiner* — Joe H Cheng (74) *Attorney, Agent, or Firm* — Sughrue Mion, PLLC (57) ABSTRACT

A display apparatus employs two tracking units to track the gaze of a user. The display apparatus includes a first tracking unit to generate position information on a user positioned relative to a displayed image; and a second tracking unit to track a gaze of the user upon the displayed image, based on the position information. A method of eye tracking using the display apparatus includes steps of displaying an image; generating position information on a user positioned relative to the displayed image; and tracking a gaze of the user upon the displayed image, based on the position information.

20 Claims, 8 Drawing Sheets

(56) References Cited

U.S. PATENT DOCUMENTS

2012/0268359 A1* 10/2012 Chen et al. .................... 345/156
2012/0272179 A1* 10/2012 Stafford ........................ 715/781
2013/0050432 A1* 2/2013 Perez et al. ..................... 348/47

OTHER PUBLICATIONS

Communication dated Jul. 19, 2013 issued by the European Patent Office in counterpart European Patent Application No. 13 155 395.0.
Communication dated Aug. 31, 2015 issued by the European Patent Office in counterpart European Patent Application No. 13 155 395.0.

* cited by examiner

EYE TRACKING METHOD AND DISPLAY APPARATUS USING THE SAME

CROSS-REFERENCE TO RELATED APPLICATION

This application claims priority from Korean Patent Application No. 10-2012-0015335, filed with the Korean Intellectual Property Office on Feb. 15, 2012, the disclosure of which is incorporated herein by reference.

BACKGROUND

1. Field of the Invention

Apparatuses and methods consistent with the exemplary embodiments relate to an eye tracking method and a display apparatus using the same, and more particularly to a method of tracking the gaze of a user ("eye tracking") using a display apparatus employing two tracking units.

2. Description of the Related Art

In general, eye tracking may refer to techniques for tracking eye movement irrespective of an object in sight, which typically employ head-mounted equipment, and techniques for tracking the gaze of a user. Gaze tracking, which may be referred to as "eye tracking," is performed to measure where a user is currently looking, i.e., the gaze of the user upon an object.

The gaze of a user can be tracked using a single camera. While employing a single camera may be effective in tracking the gaze of the user at relatively short distances from the camera, that is, at ranges of, say, 90 cm or less, it is inaccurate or otherwise ineffective at greater distances. A high-resolution camera may be used to facilitate a more accurate tracking of the gaze of a user at distances beyond 90 cm. High-resolution image processing, however, impedes the tracking of a user's gaze in real time, due to the increased processing time required.

SUMMARY

Accordingly, aspects of one or more exemplary embodiments of the present invention provide a method of tracking the gaze of a user at a distance in real time, and display apparatus using the same.

The foregoing and/or other aspects of the present invention may be achieved by providing a display apparatus including a first tracking unit to generate position information on a user positioned relative to a displayed image; and a second tracking unit to track a gaze of the user upon the displayed image, based on the position information.

The first tracking unit may include a sensor to detect a distance between the user and the displayed image and to output the position information based on the detected distance, and the position information may include coordinate information indicative of a position of the head of the user. Alternatively, the first tracking unit may include a first camera to capture a first image of the user; and a position tracking unit to derive the position information from the captured first image, wherein the position information includes coordinate information indicative of a position of the head of the user within the first image; and the second tracking unit may include a second camera to capture a second image of the user by referencing the coordinate information; and an eye tracking unit to track the gaze of the user by analyzing the second image, wherein the second image corresponds to a portion of the first image.

The foregoing and/or other aspects of the present invention may be achieved by providing a display apparatus including a tracking unit; a communication unit to receive, from a peripheral device, a first image of the user positioned relative to a displayed image; and a controller to calculate position information on the user based on the received first image and to control the tracking unit to track a gaze of the user upon the displayed image based on the position information.

The foregoing and/or other aspects of the present invention may be achieved by providing a method of eye tracking using a display apparatus, the method including displaying an image; generating position information on a user positioned relative to the displayed image; and tracking a gaze of the user upon the displayed image, based on the position information.

The foregoing and/or other aspects of the present invention may be achieved by providing a method of eye tracking using a display apparatus, the method including receiving, from a peripheral device, a first image of a user positioned relative to a displayed image; calculating position information on the user based on the received first image; and tracking a gaze of the user upon the displayed image, based on the position information.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
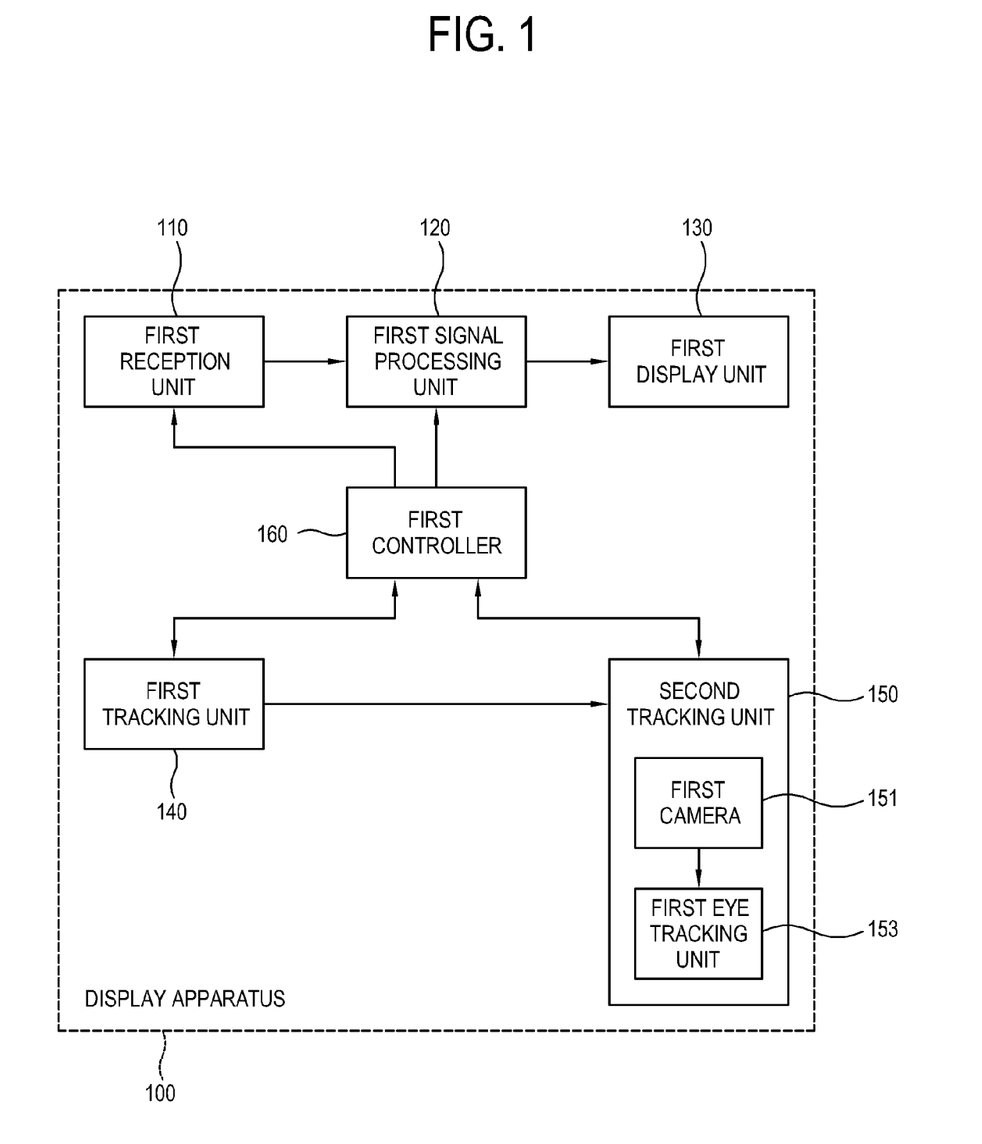
FIG. 1 is a block diagram of a display apparatus according to a first exemplary embodiment.

Referring to FIG. 1, illustrating a display apparatus according to the first exemplary embodiment, the display apparatus 100 includes a first reception unit 110, a first signal processing unit 120, a first display unit 130, a first tracking unit 140, a second tracking unit 150, and a first controller 160 for controlling the foregoing components.

The display apparatus 100 may be configured as a television receiver which displays images based on a broadcast signal transmitted from a broadcasting station, or as any of various types of devices capable of displaying images. In fact, any image may be displayed by the display apparatus 100, without being limited to broadcast images, including for example, a moving or still image based on a signal and/or data received from any of various internal or external sources (not shown), the image of an application, an on-screen display, and a graphical user interface for controlling any of various operations. Further, the display apparatus 100 may be provided as a smart TV, which is an open software platform providing bidirectional service. A smart TV is capable of a web-browsing functions while receiving and displaying of a broadcast signal in real time and may provide a convenient user interface for such operations as purchasing content (e.g., applications of offering predetermined services, including for example social network services, financial services, news, weather, maps, music, movies, games, electronic books, etc.) through the Internet.

The first reception unit 110, which may include an antenna (not shown) and/or a tuner (not shown) to receive a broadcast signal transmitted from a broadcasting station (not shown), transmits an image signal received from an external image source (not shown) to the first signal processing unit 120. The first reception unit 110 has various modes corresponding to the standard of a received image signal or the type of display apparatus 100 or its image source. For example, the first reception unit 110 may receive a signal and/or data according to high definition multimedia interface, universal serial bus, component standards, etc. and may include a plurality of connection terminals (not shown) for the respective standards.

The first signal processing unit 120 processes an image signal received from the first reception unit 110 and outputs the signal to the first display unit 130. The first signal processing unit 120 may perform at least one of various image processing processes, for example, demultiplexing to separate a signal into characteristic signals, decoding according to an image format, de-interlacing to convert an interlaced image signal into a progressive form, scaling to adjust an image signal to a preset resolution, noise reduction, detail enhancement, or frame refresh rate conversion. The first signal processing unit 120 may further include an audio signal processing unit (not shown) to process an audio signal for output to a speaker (not shown) of the display apparatus 100.

The first display unit 130 displays an image corresponding to an image signal output from the first image processing unit 120. The first display unit 130 may include a panel driver (not shown) for driving a display panel (not shown) of any type, including liquid crystal displays, plasma displays, light-emitting diode displays, organic light-emitting diode displays, surface-conduction electron-emitter displays, carbon nanotube displays, or carbon nanocrystal displays.

The first tracking unit 140 generates position information on a user who is positioned relative to the first display unit 130, or relative to the image displayed by the first display unit 130. The first tracking unit 140 may detect and output the position information by detecting a distance between the first display unit 130 (or displayed image) and the user located in front of the first display unit 130. To this end, the first tracking unit 140 may be provided as a distance detecting sensor, e.g., an ultrasonic sensor or a passive infrared sensor. The first tracking unit 140 may detect information indicative of a current position of the head of the user, such that the head-position information may include coordinates of the head relative to the first display unit 130. The first tracking unit 140 outputs the position (head-position) information, to the second tracking unit 150. The first tracking unit 140 may be constituted by a plurality of sensors (as described below) provided in the display apparatus 100.

The second tracking unit 150 tracks a user's gaze upon an image displayed by the first display unit 130, based on the position information received from the first tracking unit 140. The second tracking unit 150 includes a first camera 151 for capturing an image of the user based on the position (head-position) information received from the first tracking unit 140; and a first eye tracking unit 153 for tracking the user's gaze from the captured image. When the first tracking unit 140 outputs to the second tracking unit 150 position information relative to the first display unit 130, e.g., coordinate information indicative of a current position of the user's head relative to the image displayed by the first display unit 130, the first camera 151 may capture an image of the user, focusing on a head area or eye area of the user, based on the position (head-position) information. The first camera 151, which has zoom-in and zoom-out functions, is dedicated to eye tracking based on captures of a still image or a moving image of the user based on the head-position (coordinate) information and outputs the image captures to the first eye tracking unit 153.

The first eye tracking unit 153 analyzes the image of the user captured by the first camera 151 in order to track, based on detected pupil movement and/or current eye orientation, the gaze of a user with respect to an image displayed by the display unit 130, that is, a specific point at which the user is currently looking. To this end, the first eye tracking unit 153 may include an image processing algorithm necessary to track a user's gaze through video analysis.

The first tracking unit 140 periodically detects a user position and, as the user position changes, outputs updated position information to the second tracking unit 150. Thus, based on the updated position information, the second tracking unit 150 may track a user's gaze.

The first controller 160 generally controls the components of the display apparatus 100. Although not shown in FIG. 1, the display apparatus 100 may further include a user input unit (not shown) to enable a user selection of a request to perform eye tracking, using for example a key of an input panel provided to the display apparatus 100, provided as a user interface (e.g., touch screen) of the first display unit 130, or provided with a separate remote controller device. When an eye tracking request is input, for example, from a user, the first controller 160 controls the first tracking unit 140 to detect the position information and to output the information to the second tracking unit 150. In response to such a request, the first controller 160 controls the first camera 151 of the second tracking unit 150 to capture an image of the user, focusing on an eye area or head area of the user based on the position information. Thus, by referencing the position information, the user image can zoom in on the head or eye area and thus provide greater detail of a portion of an image, to facilitate the tracking of a user's gaze through video analysis. The first controller 160 controls the first eye tracking unit 153 to track user's gaze upon an image displayed by the display unit 130.

Figure 2:
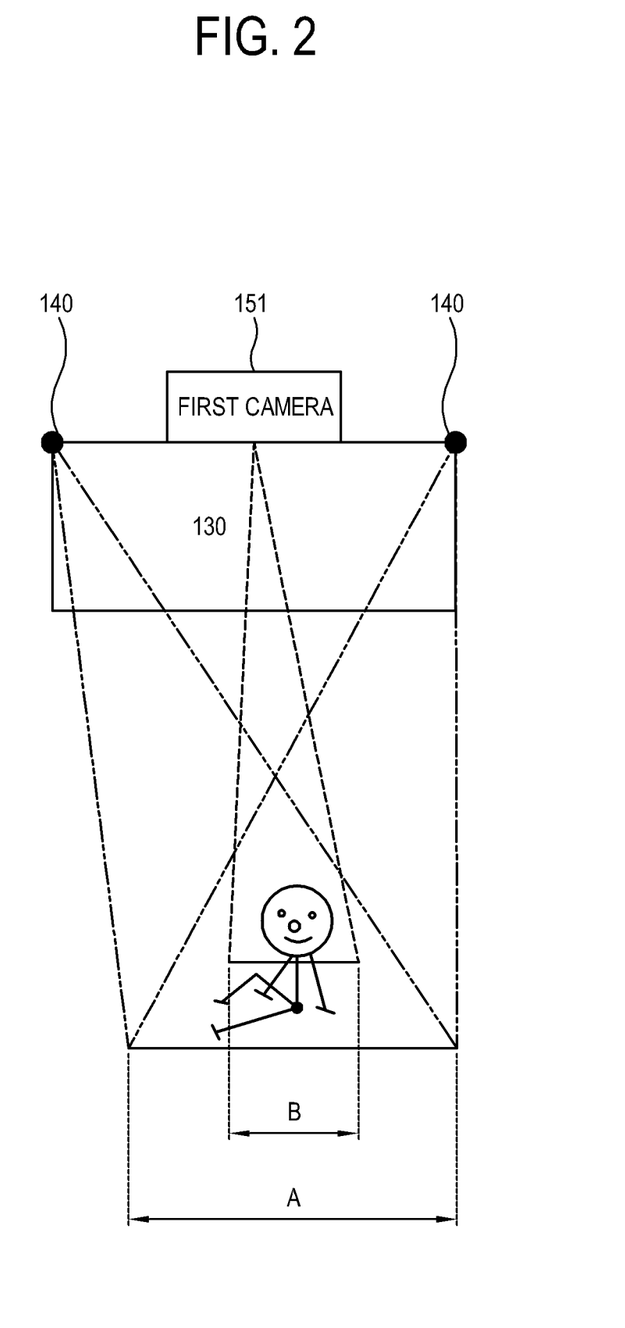
FIG. 2 is a schematic diagram for explaining an operation of the display apparatus of FIG. 1.

Referring to FIG. 2, illustrating an operation of the display apparatus of FIG. 1, the display apparatus 100 includes two sensors (140) as the first tracking unit 140 and the first camera 151 as the second tracking unit 150. The first camera 151 and the first tracking unit 140 may be provided internally or externally with respect to a frame (or bezel) of the display apparatus 100, by embedding an integrated device in the frame/bezel or by mounting a separate device on an exterior of the frame/bezel. Also, the first camera 151 may be disposed at a central part of an upper frame of the display apparatus 100, and the first tracking unit 140 may be disposed at each end part of the upper frame. The disposition of the first tracking unit 140 is based on a preferred location of the first camera 151, and vice versa. Thus, the first camera 151 and the first tracking unit 140 are not limited to a layout shown in FIG. 2 but may be arranged corresponding to various designs of the display apparatus 100.

Upon input of an eye tracking request, and under control of the first controller 160, the first tracking unit 140, which has a detection range A, detects the current position of a user located in front of the display apparatus 100, as exemplified in FIG. 2. The user position may be expressed as a distance from the display apparatus 100, as measured by a distance detecting sensor constituting the first tracking unit 140. After detecting the position of the user, the first tracking unit 140 may calculate coordinate information (i.e., head-position information) based on the detected user position. The first tracking unit 140 outputs the calculated coordinate information to the second tracking unit 150. Then, based on the head-position information, the second tracking unit 150, which has a detection range B, may capture an image of the user by zooming in and focusing on the user's head area or eye area. Positional information from the first tracking unit 140 enables the second tracking unit 150 to zoom in on the head of the user and thus capture more detailed information regarding the head or eyes of a user.

The first tracking unit 140 is capable of detecting the position of the user at distances greater than 90 cm from a front screen of display apparatus 100. The second tracking unit 150 is capable of capturing a detailed image (i.e., close up) of the user, using the zoom-in function and focusing on the head area or the eye area of the user, based on the coordinate information indicative of the position of the head of the user, as input from the first tracking unit 140. The detailed image facilitates quickly tracking the gaze of the user through image analysis, thereby making it possible to track the gaze of the user in real time. Thus, according to an exemplary embodiment, the gaze of a user located at relatively long distances from the display apparatus 100 can be tracked in real time.

Figure 3:
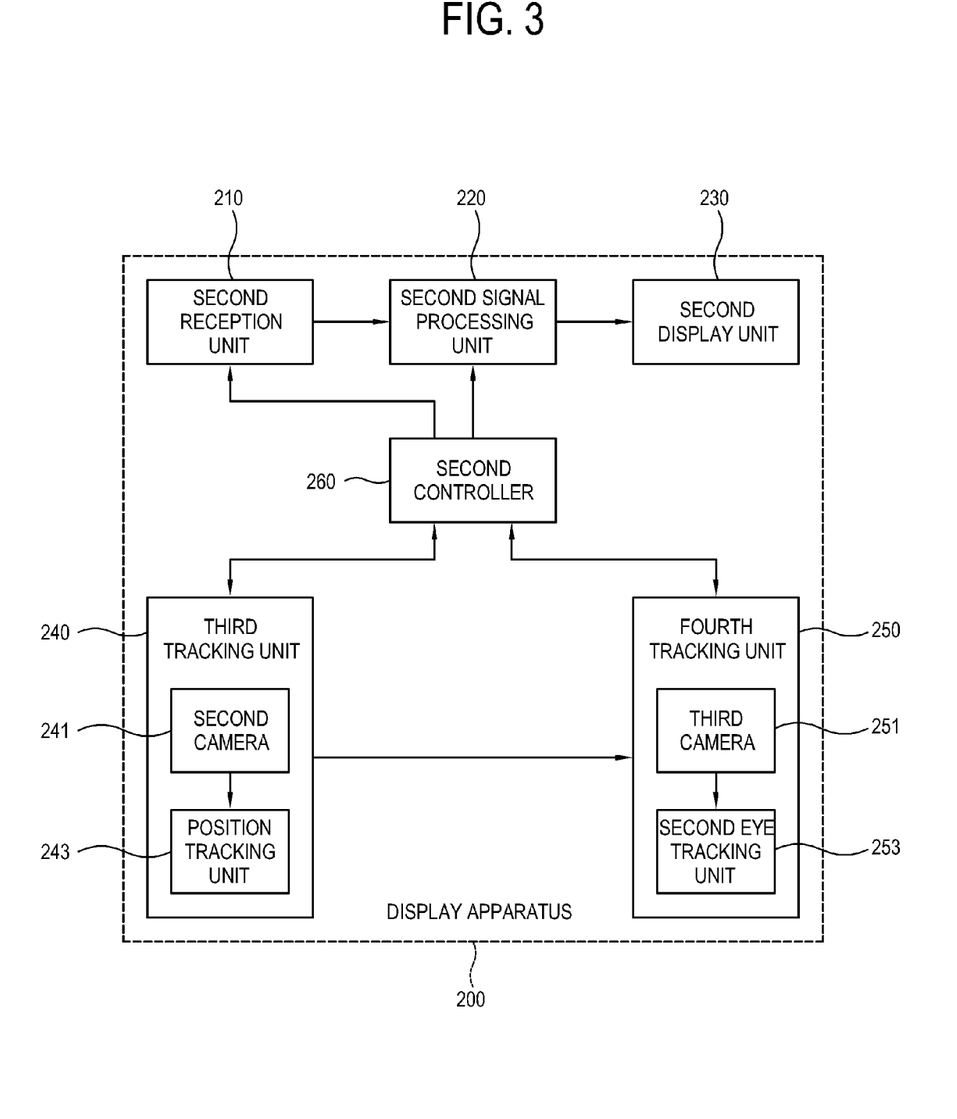
FIG. 3 is a block diagram of a display apparatus according to a second exemplary embodiment.

Referring to FIG. 3, illustrating a display apparatus according to the second exemplary embodiment, a display apparatus 200 includes a second reception unit 210, a second signal processing unit 220, a second display unit 230, a third tracking unit 240, a fourth tracking unit 250, and a second controller 260 for controlling the foregoing components. The display apparatus 200 may include a user input unit (not shown) to input a user selection, such as that described in relation to FIG. 1. Except for the third tracking unit 240, components of the display apparatus 200 perform the same or analogous functions as corresponding components of the display apparatus 100 of FIG. 1; descriptions of such components are therefore omitted herein.

The third tracking unit 240 includes a second camera 241 and a position tracking unit 243. The third tracking unit 240 has purposes and effects similar to those of the first tracking unit 140, except that, instead of a distance detecting sensor, the third tracking unit 240 is provided as a camera for capturing an image of a user. The second camera 241 has zoom-in and zoom-out functions and captures a still image or moving image of the user.

In response to an input of eye tracking request, and under control of the second controller 260, the second camera 241 captures a first image of the user, by zooming out, to thereby generate position information on the user relative to the second display unit 230, or relative to the image displayed by the second display unit 230. The first image is captured as a zoomed-out image, that is, including the full body or the upper body of the user.

The position tracking unit 243 receives the first image of the user from the second camera 241 and calculates relative positional information on the user through image analysis.

Here, the position tracking unit 240 calculates information indicative of the position of the head of the user through the image analysis and outputs the calculated information to the fourth tracking unit 250.

The fourth tracking unit 250 performs a function similar to that of the second tracking unit 150 and includes a third camera 251 and a second eye tracking unit 253. The third camera 251 may take a second image of the user, focusing on a head area or eye area of the user, based on the position (or head-position) information received from the third tracking unit 240. That is, the second image may correspond to a portion of the first image of the user, where the second image is effectively an enlarged or detailed version of a focused on portion of the first image. The third camera 251, which has zoom-in and zoom-out functions, is dedicated to eye tracking based on captures of a still image or a moving image of the user based on the head-position (coordinate) information and outputs the image captures to the second eye tracking unit 253.

The second eye tracking unit 253 may track where the user is looking on an image displayed by the second display unit 230 by analyzing the user image captured by the third camera 251 and detecting pupil movement and/or current eye orientation. To this end, the second eye tracking unit 253 may include an image processing algorithm necessary to track user's gaze through video analysis.

The third tracking unit 240 periodically captures the first image of the user to detect changes in user position. If the analysis of the first image determines that the user position changes, the third tracking unit 240 calculates and outputs updated position information to the fourth tracking unit 250. Thus, based on the updated position information, the fourth tracking unit 250 may track a user's gaze.

Alternatively, when an eye tracking request is input, the second controller 260 controls the third tracking unit 240 to capture the first image of the user and controls the fourth tracking unit 250 to capture the second image of the user. The second controller 260 controls the position tracking unit 243 to compare and analyze the two images to determine the positional information on the user relative to the second display unit 230, or relative to the image displayed by the second display unit 230. Then, the second controller 260 transmits the position information to the fourth tracking unit 250 and controls the third camera 251 to capture a detailed image of the user's head or eye area, using the zoom-in function, by referencing the position information.

Figure 4:
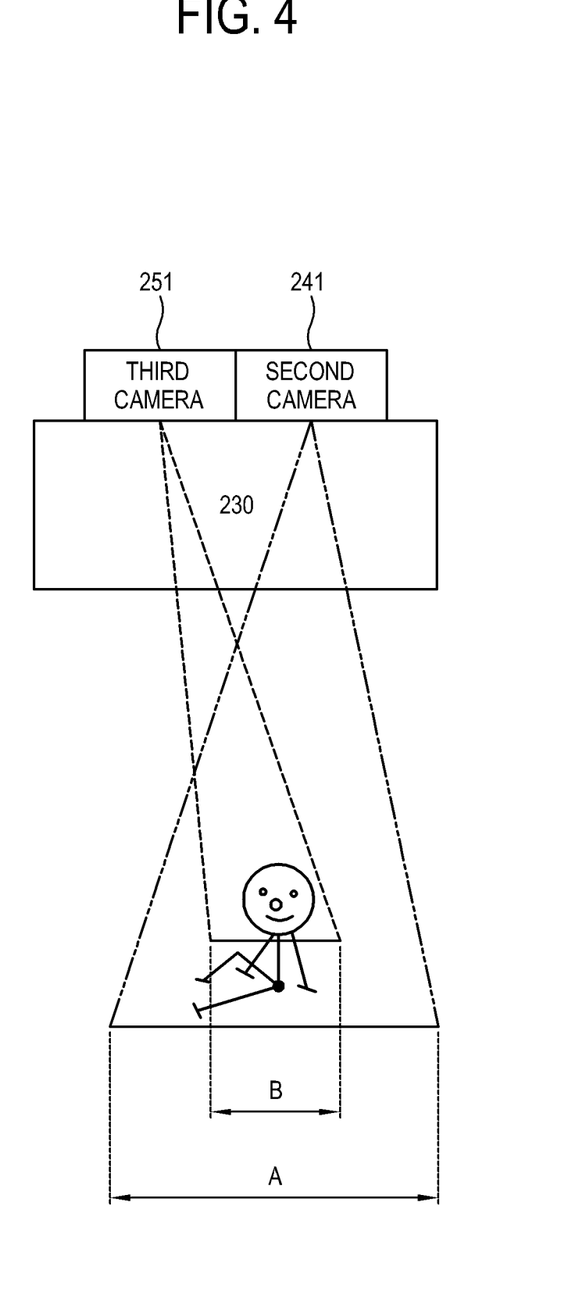
FIG. 4 is a schematic diagram for explaining an operation of the display apparatus of FIG. 3.

Referring to FIG. 4, illustrating an operation of the display apparatus of FIG. 3, the display apparatus 200 includes the second camera 241 as the third tracking unit 240 and the third camera 251 as the fourth tracking unit 250. The second camera 241, which has an image capture range A, may capture a first image of the full body or the upper body of the user using the zoom-out function. Through analysis of the first image, the third tracking unit 240 recognizes the coordinate information indicative of the position of the head of the user and outputs the information to the fourth tracking unit 250. The third camera 251, which has an image capture range B, captures a second image of the user, using the zoom-in function and focusing on the head area or eye area of the user, based on the head-position information, thereby tracking the gaze of the user upon an image displayed by the second display unit 230. Thus, according to an exemplary embodiment, the gaze of a user located at relatively long distances from the display apparatus 200 can be tracked in real time.

Figure 5:
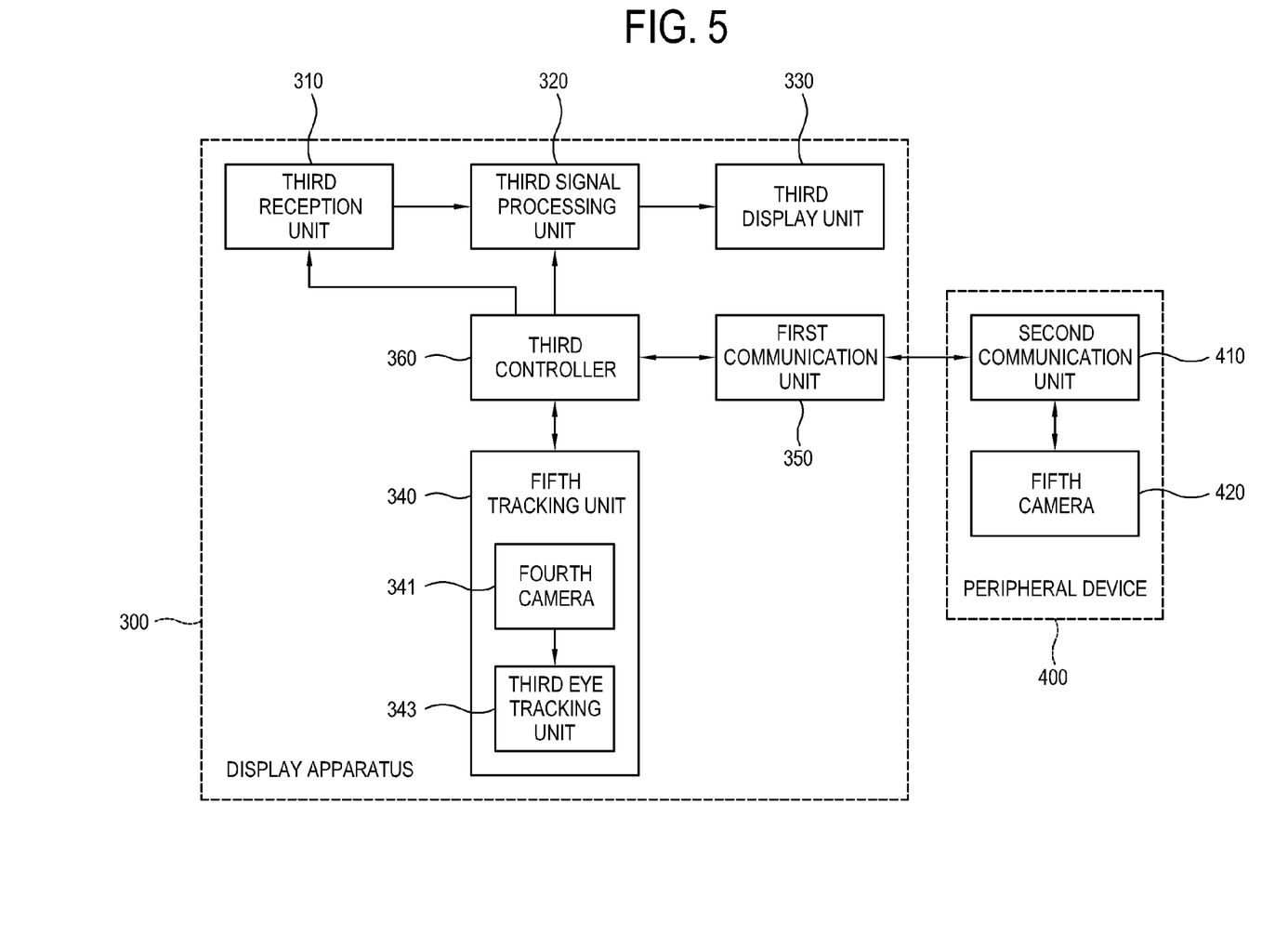
FIG. 5 is a block diagram of a display apparatus according to a third exemplary embodiment.

Referring to FIG. 5, illustrating a display apparatus according to the third exemplary embodiment, a display apparatus 300 includes a third reception unit 310, a third image processing unit 320, a third display unit 330, a first communication unit 350, a fifth tracking unit 340, and a third controller 360 for controlling the foregoing components. The display apparatus 200 may include a user input unit (not shown) to input a user selection, such as that described in relation to FIG. 1.

Meanwhile, a peripheral device 400 for communicating with the first communication unit 350 includes a second communication unit 410 and a fifth camera 420, which captures a first image of a user and transmits the captured image to the display apparatus 300. This captured first image by the peripheral device 400 can be compared with the output from the first tracking unit 140 of the display apparatus 100, and based on the first image received from the peripheral device 400, the second image of the user is captured by the fifth tracking unit 340, which tracks the gaze of the user upon an image displayed by the display apparatus 300. Thus, the display apparatus 300 does not include a component corresponding to the first tracking unit 140 of FIG. 1; instead, the display apparatus 300 includes the first communication unit 350 for communicating with the peripheral device 400. The first communication unit 350 may communicate with the peripheral device 400 through a wired or wireless connection or over a network, to enable the display apparatus 300 and the peripheral device 400 to transmit and receive various data signals, image signals, and control signals from each other. Other components perform functions equivalent or similar to those of corresponding components of the display apparatus 100 of FIG. 1; descriptions of such components are therefore omitted herein.

Upon input of an eye tracking request, the third controller 360 controls the first communication unit 350 to transmit a control command for capturing the first image of the user to the peripheral device 400 and to receive the first image of the user from the peripheral device 400 according to the control command. The third controller 360 may calculate position information from the first image of the user. For example, the third controller 360 analyzes the first image to calculate head-position information and transmits the calculated information to the fifth tracking unit 340.

The fifth tracking unit 340 performs a function similar to that of the second tracking unit 150 and includes a fourth camera 341 and a third eye tracking unit 343. Under control of the third controller 360, the fourth camera 341 may capture the second image of the user, using a zoom-in function and focusing on a head area or eye area of the user, by referencing the head-position (coordinate) information. That is, the second image may include a detailed image corresponding to a portion of the first image of the user. The fourth camera 341, which has zoom-in and zoom-out functions, is dedicated to eye tracking based on captures of a still image or a moving image of the user images based on the head-position (coordinate) information and outputs the image captures to the third eye tracking unit 343. The third eye tracking unit 343 may track where the user is looking on an image displayed by the third display unit 330 by analyzing the second image of the user captured by the fourth camera 341 and detecting pupil movement and/or current eye orientation. To this end, the third eye tracking unit 343 may include an image processing algorithm necessary to track user's gaze through video analysis.

The third controller 360 periodically transmits a control command for capturing the first image to the peripheral device 400 in order to detect changes in user position. If the analysis of the first image determines that the user position changes, the third controller 360 calculates and outputs updated position information to the fifth tracking unit 340.

Thus, based on the updated position information, the fifth tracking unit 340 may track a user's gaze.

Alternatively, when an eye tracking request is input, the third controller 360 transmits a control command for capturing an image of the user to the peripheral device 400 and to the fourth camera 341 of the fifth tracking unit 340. The third controller 360 respectively receives first and second images of the user from the peripheral device 400 and the fourth camera 341, respectively, and compares and analyses the images, thereby determining positional information on the user relative to the third display unit 330, or relative to the image displayed by the third display unit 330. Then, the third controller 360 transmits the position information to the fifth tracking unit 340 and controls the fourth camera 341 to capture a detailed image of the user's head or eye area, using the zoom-in function, by referencing the position information.

The peripheral device 400 includes the fifth camera 420 for capturing an image and the second communication unit 410 for communicating with the display apparatus 300. The peripheral device 400 may include any portable device having a camera, for example, an electronic camera, a smart phone, a cellular phone with a camera, a personal computer, a tablet PC, or a laptop. The second communication unit 410 communicates with the first communication unit 350 of the display apparatus 300. When receiving a control command for capturing an image of the user from the display apparatus 300, the second communication unit 410 transmits the control command to the fifth camera 420. The fifth camera 420 captures a first image of the user according to the control command and transmits the captured image to the second communication unit 410, which in turn transmits the image to the display apparatus 300.

Figure 6:
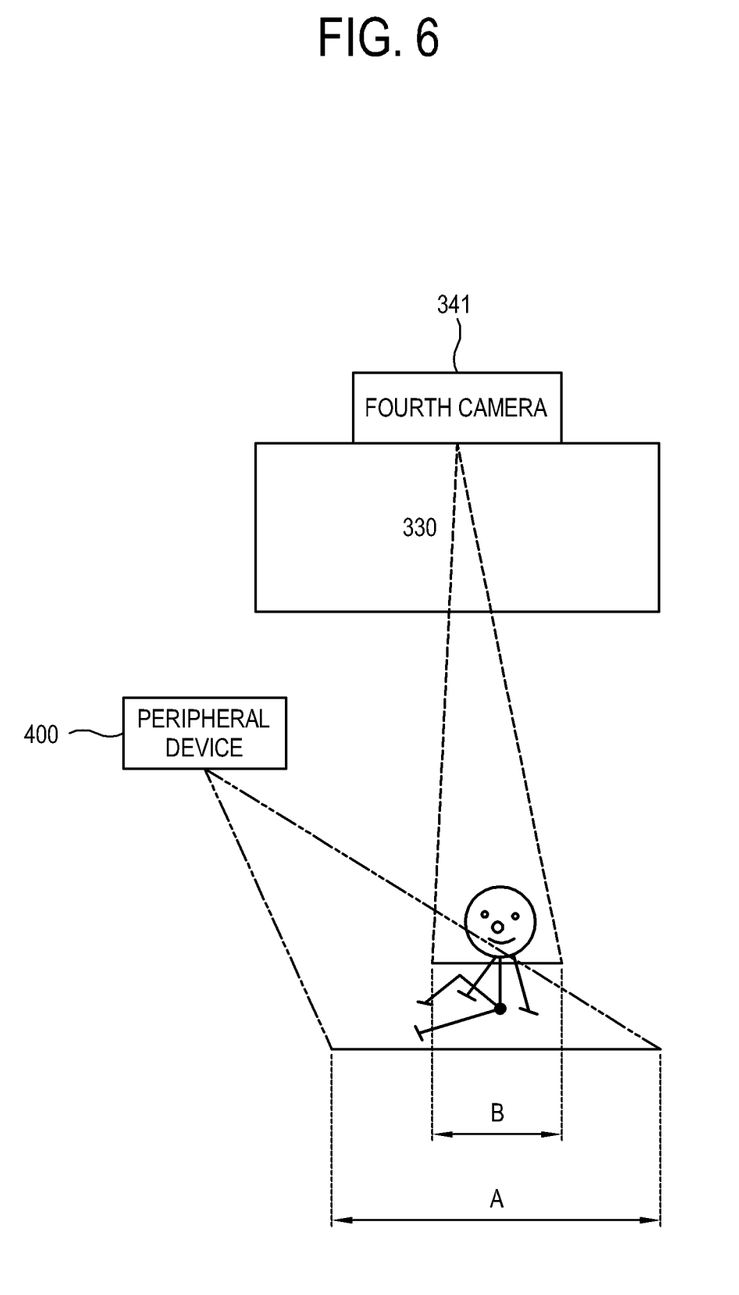
FIG. 6 is a schematic diagram for explaining an operation of the display apparatus of FIG. 5.

Referring to FIG. 6, illustrating an operation of the display apparatus of FIG. 5, when an eye tracking request is input to the display apparatus 300, the third controller 360 transmits a control command for capturing an image of the user to the peripheral device 400. The fifth camera 420, which has an image capture range A, uses the zoom-out function to capture a first image of the full body or the upper body of the user according to the control command. The peripheral device 400 transmits the captured first image to the display apparatus 300, and through analysis of the first image, the third controller 360 recognizes the coordinate information indicative of the position of the head of the user and outputs the information to the fifth tracking unit 340. The fourth camera 341 of the fifth tracking unit 340, which has an image capture range B, captures a second image of the user, using the zoom-in function and focusing on the head area or eye area of the user, based on the head-position information, thereby tracking the gaze of the user upon an image displayed by the third display unit 330. Thus, according to an exemplary embodiment, the gaze of a user located at relatively long distances from the display apparatus 300 can be tracked in real time.

Figure 7:
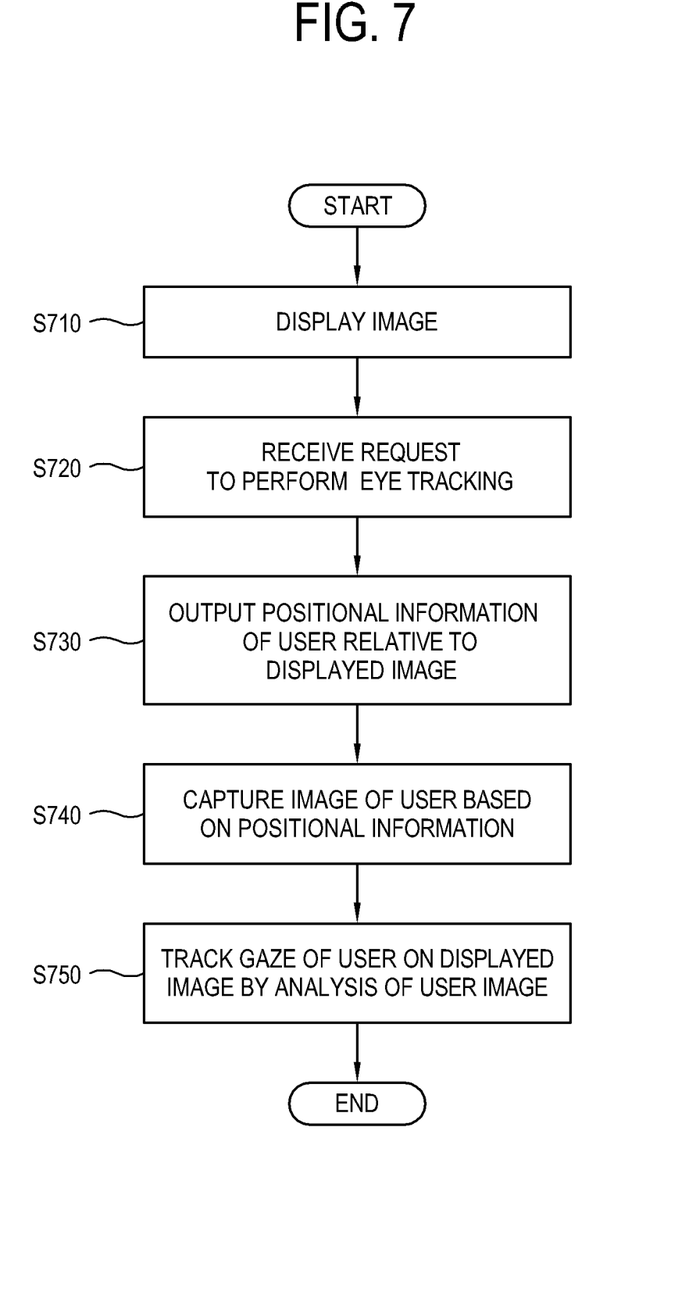
FIG. 7 is a flowchart illustrating a control process of the display apparatus of FIG. 1.

Referring to FIG. 7, illustrating a control process of the display apparatus of FIG. 1, the first display unit 130 of the display apparatus 100 displays an image (S710). In response to an eye tracking request input through the user input unit (S720), the first controller 160 controls the first tracking unit 140 to detect position information on a user who is positioned relative to (e.g., in front of) the first display unit 130, or relative to the image displayed by the display unit 130. The position information is output to the second tracking unit 150 (S730). The position information is determined by detecting, using the first tracking unit 140, a distance of the user from the display unit 130, or the distance between the user and the image displayed by the display unit 130. In other words, the position information is based on the detected distance. With the position information thus determined, the first camera 151 of the second tracking unit 150 captures an image of the user based on the position information, using a zoom function to zoom in on (focus on) the head area or eye area of the user (S740). By focusing on the head area or eye area of the user, the area is effectively enlarged. The image is transmitted to the first eye tracking unit 153, which analyzes the received image in order to track the gaze of the user upon the image displayed by the first display unit 130 in the step S710 (S750).

In the case of the second display apparatus 200, at the step S730, the second controller 260 controls the second camera 341 of the third tracking unit 340 to capture a first image of the user, including the full body or upper body of the user, and then controls the position tracking unit 243 to analyze the captured first image in order to calculate the position information. Other steps of the process are substantially the same as or analogous to those of the display apparatus 100.

Figure 8:
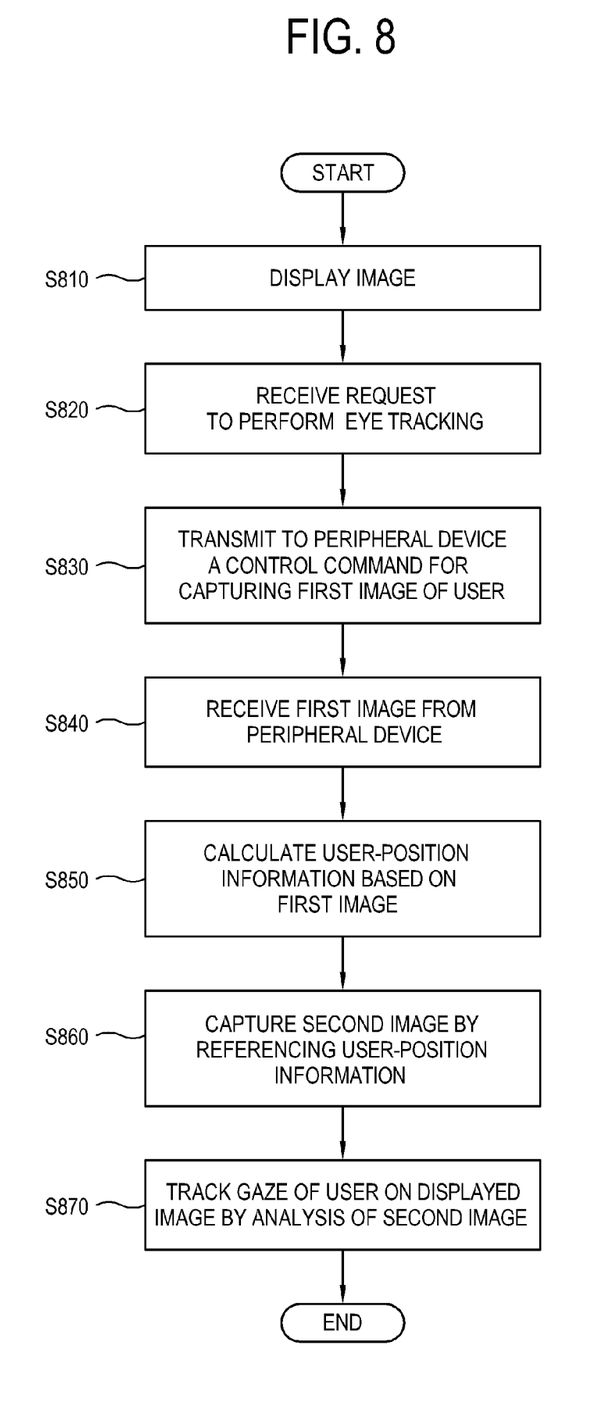
FIG. 8 is a flowchart illustrating a control process of the display apparatus of FIG. 5.

Referring to FIG. 8, illustrating a control process of the display apparatus of FIG. 5, the third display unit 330 of the display apparatus 300 displays an image (S810). In response to an eye tracking request input through the user input unit (S820), the third controller 360 generates a control command for capturing an image of the user and transmits the control command to the peripheral device 400 (S830). Thus, under control of the third controller 360, the peripheral device 400 captures a first image of the user, including the full body or upper body of the user, and transmits the captured image to the display apparatus 300 (S840). The third controller 360 analyzes the first image received from the peripheral device 400 and calculates position information based on the received first image (S850). The third controller 360 transmits the position information to the fifth tracking unit 540 and controls the fourth camera 341 of the fifth tracking unit 540 to capture a second image of the user by referencing the position information, using a zoom function to zoom in on (focus on) the head area or eye area of the user (S860). Here, the applied position information is coordinate information indicative of a position of the user's head (or eye) as it appears within the first image, such that the second image corresponds to a specific (focused on) portion of the first image. The second image of the user is transmitted to the third eye tracking unit 343, which analyzes the second image of the user in order to track the gaze of the user upon the image displayed by the third display unit 330 in the step S810 (S870).

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
 a display to display an image;
 a first tracking unit to generate position information on a user positioned relative to the displayed image; and
 a second tracking unit to capture a first image of the user, to determine a portion of the captured first image corresponding to a position of the user, based on the position information, to zoom in the portion of the captured first image, and to track a gaze of the user upon the displayed image by analyzing the zoomed in portion of the first image.

2. The display apparatus of claim 1, wherein the first tracking unit comprises:
 a sensor to detect a distance between the user and the displayed image and to output the position information based on the detected distance.

3. The display apparatus of claim 1, wherein the first tracking unit comprises:
 a first camera to capture the first image of the user; and
 a position tracking unit to derive the position information from the captured first image,
 wherein the position information includes coordinate information indicative of a position of the head of the user within the first image.

4. The display apparatus of claim 1, wherein the position information includes coordinate information indicative of a position of the head of the user.

5. The display apparatus of claim 4, wherein the second tracking unit comprises:
 a second camera to capture a second image of the user by referencing the coordinate information; and
 an eye tracking unit to track the gaze of the user by analyzing the second image.

6. The display apparatus of claim 5, wherein the second image corresponds to a portion of the first image.

7. A display apparatus comprising:
 a display to display an image;
 a tracking unit;
 a communication unit to receive, from a peripheral device, a first image of a user positioned relative to the displayed image; and
 a controller to calculate position information on the user based on the received first image, to determine a portion of the first image corresponding to a position of the user based on the position information, to zoom in the portion of the mage, and to control the tracking unit to track a gaze of the user upon the displayed image by alalyzing the zoomed in portion of the first image.

8. The display apparatus of claim 7, wherein the position information includes coordinate information indicative of a position of the head of the user within the first image.

9. The display apparatus of claim 8, wherein the tracking unit comprises:
 a camera to capture a second image of the user by referencing the coordinate information; and
 an eye tracking unit to track the gaze of the user by analyzing the second image.

10. The display apparatus of claim 9, wherein the second image corresponds to a portion of the first image.

11. A method of eye tracking using a display apparatus, the method comprising:
 displaying an image;
 generating position information on a user positioned relative to the displayed image;
 capturing a first image of the user;
 determining a portion of the captured first image corresponding to a position the user based on the position information;
 zooming in the portion of the captured first image; and
 tracking a gaze of the user upon the displayed image by analyzing the zoomed portion of the first image.

12. The method of claim 11, further comprising:
 detecting a distance between the user and the displayed image,
 wherein the position information is based on the detected distance.

13. The method of claim 11, wherein the position information includes coordinate information indicative of a position of the head of the user.

14. The method of claim 13, further comprising:
 capturing a second image of the user by referencing the coordinate information, wherein the gaze of the user is tracked by analyzing the second image.

15. The method of claim 14, wherein the second image corresponds to a portion of the first image.

16. The method of claim 11, further comprising:
capturing the first image of the user,
wherein the position information is derived from the captured first image and includes coordinate information indicative of a position of the head of the user within the first image.

17. A method of eye tracking using a display apparatus, the method comprising:
receiving, from a peripheral device, a first image of a user positioned relative to a displayed image;
calculating position information on the user based on the received first image;
determining a portion of the first image corresponding to a position of the user based on the position information;
zooming in the portion of the first image; and
tracking a gaze of the user upon the displayed image, by analyzing the zoomed in portion of the first image.

18. The method of claim 17, wherein the position information includes coordinate information indicative of a position of the head of the user within the first image.

19. The method of claim 18, further comprising:
capturing a second image of the user by referencing the coordinate information,
wherein the gaze of the user is tracked by analyzing the second image.

20. The method of claim 19, wherein the second image corresponds to a portion of the first image.

\* \* \* \* \*